Nov. 12, 1940.  J. W. FOLEY  2,221,513
BALL OR ROLLER BEARING
Original Filed June 12, 1939
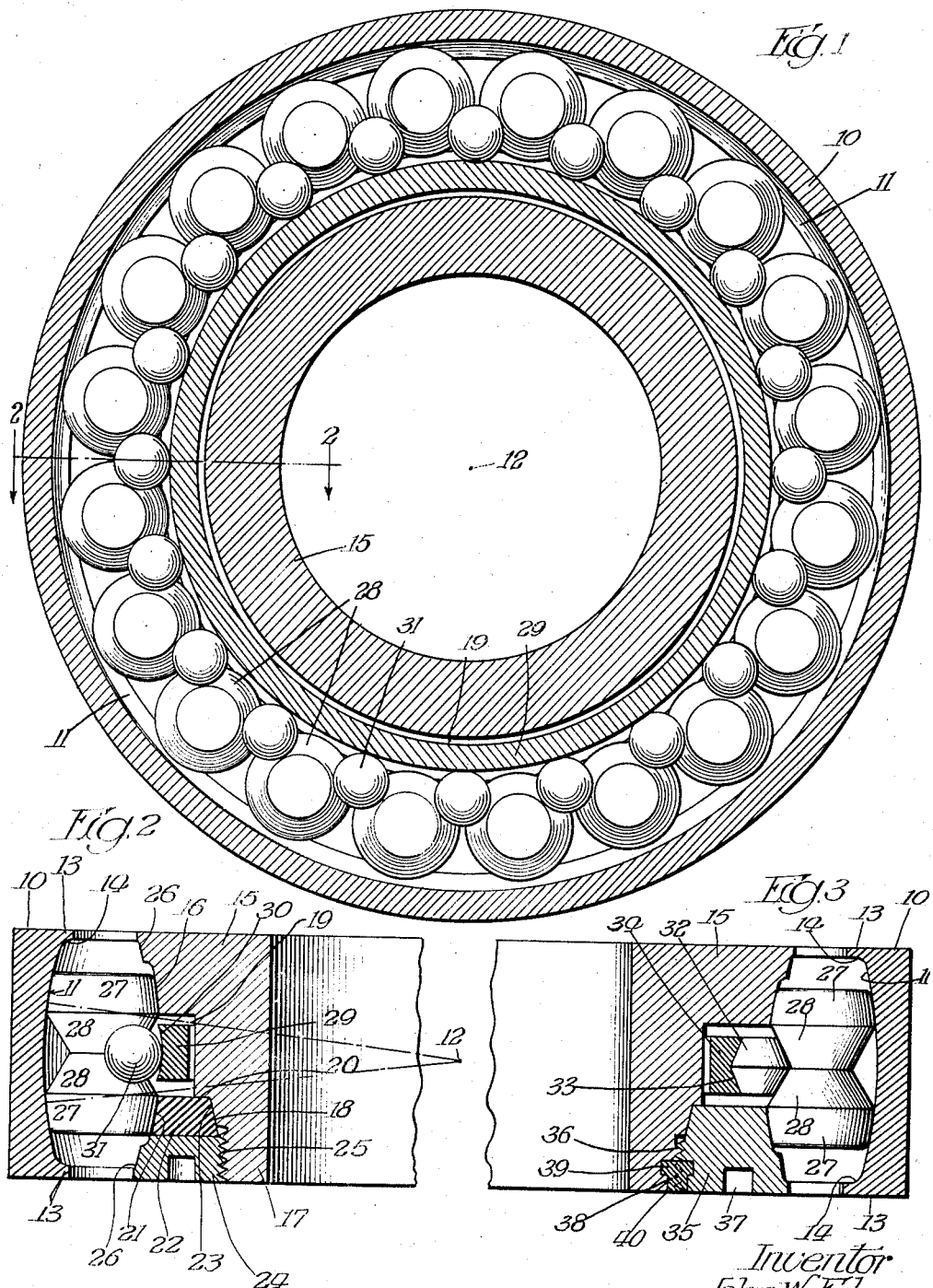
Inventor
John W. Foley Patented Nov. 12, 1940

2,221,513

UNITED STATES PATENT OFFICE 2,221,513

BALL OR ROLLER BEARING

John W. Foley, Chicago, Ill.

Original application June 12, 1939, Serial No. 278,589. Divided and this application March 16, 1940, Serial No. 324,289

9 Claims. (Cl. 308—206)

This application is a division of original application Serial #278,589 filed June 12, 1939.

The present invention relates to improvements in anti-friction bearings and more particularly to the construction of the same and in the manner in which the parts may be secured together, and one of the objects of the invention is to provide an adjustable self-alining bearing in which the active points of contacts of the balls or rollers with the bearing members is reduced to a minimum.

A further object is to provide in a bearing of this character roller or bearing surfaces which are uninterrupted and continuous from one side to the other, the extremities of such surfaces being curved and free from sharp corners or abrupt projections, whereby the rollers or balls will not be injured or marred, which would be the result if they did contact such abrupt formations by a relative lateral tilting of the inner and outer bearing rings one with respect to the other.

A further object is to provide an improved construction of bearing of this character in which the parts may be readily separated to permit access to the interior thereof, and improved means for maintaining the parts of the bearing in locked relation, thereby obviating a creeping or slipping of the parts of the bearing one with relation to the other.

A further object is to provide an improved bearing of this character which will be of a simple and durable construction, comparatively inexpensive to manufacture, and efficient and effective in operation.

To the attainment of these ends and the accomplishment of other new and useful objects as will appear, the invention consists in the features of novelty in substantially the construction, combination and arrangement of the several parts, hereinafter more fully described and claimed and shown in the accompanying drawing illustrating the invention, and in which Figure 1 is a view partly in side elevation, partly broken away, and partly in section of a bearing of this character constructed in accordance with the principles of this invention.

Figure 2 is a horizontal sectional view taken on line 2—2 Figure 1.

Figure 3 is a detail sectional view of a modified form of bearing.

Referring more particularly to the drawing, the numeral 10 designates generally an annular outer bearing member of any desired size, the inner peripheral surface 11 of which is continuous from one side to the other side and such surface is preferably struck on an arc described from the center 12 of the member 10. The surface 11 preferably terminates short of the lateral sides of the member 10, as at 13, and the surfaces 14 adjacent the sides 13 are formed on another arc so as to prevent the formation of abrupt shoulders at the junction of the surfaces 11 with the side portions 13.

The numeral 15 designates an inner annular bearing member having a bearing surface 16 formed on the outer periphery thereof adjacent to one side of the member, while the opposite side of the member 16 is reduced, as at 17, to form a bearing surface 18.

The central portion of the periphery of the member 15 is recessed as at 19, and between the bottom of the recess 19 and the surface 18 there is provided a shoulder 20. A bearing surface 21 is provided on an annular bearing member 22 and this annular member is provided with an inclined surface 23 that contacts with the surface 18, the latter being also inclined. This member 22 abuts the shoulder 20 which latter is adjacent the surface 18, and the member 22 is held in position by another annular member 24 that has threaded engagement, as at 25, with the member 15. A portion of the outer periphery of the member 24 is shaped to coincide with the bearing surface 21, but this latter surface is also curved as is also the outer portion of the surface 16, as at 26, for a purpose to be described.

The rollers in the form of the invention shown in Figures 1 and 2 are provided with body portions 27 which contact the respective surfaces 16 and 21 and portions of these rollers 27 are frusto conical, as at 28, and abut each other so that when the rollers are in position they will have contact with the bearing surface 16, 21 and 11, and will roll as a unit. An inner floating annular bearing ring 29 is provided in the recess 19 and has a bearing surface 30 with which small balls 31 contact, and these balls 31 also contact with the frusto conical surfaces 28 in the rollers 27.

In the form of the invention shown in Figure 3, the small rollers 32 which contact the frusto conical surfaces 28 of the rollers 27 are preferably in the form of a double frustrum and engage a corresponding bearing surface 33 of the outer periphery of an inner floating bearing ring 34. In this form of the invention the annular member 35 is of an integral construction and is connected with the bearing member 15 preferably by means of screw threads 36, spanner or socket wrench openings 37 being provided for manipulating the member 35.

In order to maintain the member 35 against accidental movement with respect to the member 15, it is sealed or locked in position preferably by means of metal 38 such as Babbitt, that may be poured into a recess 39 formed partly in the member 35 and partly in the member 15, the recess being provided with a restricted entrance 40 opening through the lateral face of the member 15 and the member 35.

With this invention it will be manifest that the parts may be readily assembled and access may be readily had to the interior of the bearing.

Furthermore, the bearing surfaces are constructed so that the rollers will have line contacts with the bearing surfaces, the latter being shaped to form clearance spaces beyond the points of contact so that in the event of any twisting or straining of the member 15, 22 and 10, one with respect to the other, the rollers will not contact abrupt corners or surfaces, which contact would tend to mar or injure the bearing.

Furthermore, with this improved construction it will be manifest that there is provided a self-alining bearing, and the parts are so constructed that friction will be reduced to a minimum.

While the preferred forms of the invention have been herein shown and described, it is to be understood that various changes may be made in the details of construction and in the combination and arrangement of the several parts within the scope of the claims without departing from the spirit of this invention.

What is claimed as new is:

1. In a roller bearing an outer ring having a curved bearing on its inner periphery extending substantially from one side to substantially the other side thereof, an inner ring embodying two ring members separably secured together, the outer periphery of the members of the inner ring being shaped to form bearing surfaces, the bearing faces of said members being formed on the same radius, rollers between and contacting said bearing surfaces, each roller having a line contact with each of said surfaces, a floating inner ring member, and roller members contacting said floating member and the adjacent first said rollers, the outer extremities of said bearing surfaces being shaped to provide clearance space for the rollers and being formed on an arc.

2. In a roller bearing an outer ring having a curved bearing on its inner periphery extending substantially from one side to substantially the other side thereof, an inner ring embodying two ring members separably secured together, the outer periphery of the members of the inner ring being shaped to form bearing surfaces, the bearing surfaces of said members being formed on the same radius, rollers between and contacting said bearing surfaces, each roller having a line contact with each of said surfaces, a floating inner ring member, roller members contacting said floating member and the adjacent first said rollers, the outer extremities of said bearing surfaces being shaped to provide clearance space for the rollers and being formed on an arc, and means for securing the members of the inner bearing member in assembled relation.

3. In a bearing of the character described, a solid outer ring provided with a curved bearing surface on its inner periphery continuous substantially from one side thereof to the other side, the extremities of said surface being curved to prevent the formation of abrupt corners, an annular inner bearing member divided in planes forming a plurality of separate annular members arranged edge to edge, a portion of one of the last said members being reduced to form a shoulder, the second of the last said members encompassing said reduced portion and abutting said shoulder, still another of the last said members being detachably secured to the said member which is provided with said reduced portion and abutting the said second member, certain of the members of the inner bearing member being shaped to form curved bearing surfaces, a floating annular bearing member encompassed by said rollers, and balls engaging said floating member and the adjacent first said rollers.

4. In a bearing of the character described, a solid outer ring provided with a curved bearing surface on its inner periphery continuous substantially from one side thereof to the other side, the extremities of said surface being curved to prevent the formation of abrupt corners, an annular inner bearing member divided in planes forming a plurality of separate annular members arranged edge to edge, a portion of one of the last said members being reduced to form a shoulder, the second of the last said members encompassing said reduced portion and abutting said shoulder, still another of the last said members being detachably secured to the said member which is provided with said reduced portion and abutting the said second member, certain of the members of the inner bearing member being shaped to form curved bearing surfaces, a floating annular bearing member encompassed by said rollers, and balls engaging said floating member and the adjacent first said rollers, portions of said rollers being frustro conical, said frustro conical portions abutting each other.

5. In a bearing of the character described, a solid outer ring provided with a curved bearing surface on its inner periphery continuous from substantially one side thereof to substantially the opposite side, an inner ring member divided in a plane forming two separate annular members, means separably securing said inner ring members together, rollers between said ring members, said rollers each comprising two elements having abutting frustro conical portions, a floating inner bearing member, rollers contacting the outer periphery of the said floating member and the said elements of the first said rollers, and means for locking the annular members of the said inner ring against relative movement.

6. In a bearing of the character described, a solid outer ring provided with a curved bearing surface on its inner periphery continuous from substantially one side thereof to substantially the opposite side, an inner ring member divided in a plane forming two separate annular members, means separably securing said inner ring members together, rollers between said ring members, said rollers each comprising two elements having abutting frustro conical portions, a floating inner bearing member, rollers contacting the outer periphery of the said floating member and the said elements of the first said rollers, and means for locking the annular members of the said inner ring against relative movement, the last said means embodying co-operating recesses in adjacent faces of said annular members to provide a seat and a restricted entrance to said seat opening through a face of said ring members, said seat adapted to receive a sealing material through said entrance opening.

7. In a roller bearing an outer ring having a curved bearing on its inner periphery extending substantially from one side to substantially the other side thereof, an inner ring embodying two ring members separably secured together, the outer periphery of the members of the inner ring being shaped to form bearing surfaces, the bearing faces of said members being formed on the same radius, rollers between and contacting said bearing surfaces, each roller having a line contact with each of said surfaces, a floating inner ring member, roller members contacting said floating member and the adjacent first said rollers, the outer extremities of said bearing surfaces being shaped to provide clearance space for the rollers and being formed on an arc, the first said rollers increasing in diameter from the longitudinal center thereof in directions towards the outer ends of the rollers.

8. In a roller bearing an outer ring having a curved bearing on its inner periphery extending substantially from one side to substantially the other side thereof, an inner ring embodying two ring members separably secured together, the outer periphery of the members of the inner ring being shaped to form bearing surfaces, the bearing faces of said members being formed on the same radius, rollers between and contacting said bearing surfaces, each roller having a line contact with each of said surfaces, a floating inner ring member, roller members contacting said floating member and the adjacent first said rollers, the outer extremities of said bearing surfaces being shaped to provide clearance space for the rollers and being formed on an arc, the first said rollers increasing in diameter from the longitudinal center thereof in directions towards but terminating a substantial distance short of the extremities of the rollers and then decreasing in diameter towards the respective extremities of the rollers.

9. In a bearing of the character described, a solid outer ring provided with a curved bearing surface on its inner periphery continuous from substantially one side thereof to substantially the opposite side, an inner ring member divided in a plane forming two separate annular members, means separably securing said inner ring members together, rollers between said ring members, said rollers each comprising two elements having abutting frustro conical portions, a floating inner bearing member, and rollers contacting the outer periphery of said floating member and the said elements of the first said rollers, the second recited rollers conforming in contour to the contour of the surface of the element of the first said rollers which they contact.

JOHN W. FOLEY.